May 14, 1940.　　　S. J. A. M. BAGNO　　　2,201,020
ELECTRIC INDICATOR
Filed June 30, 1937　　　2 Sheets-Sheet 1
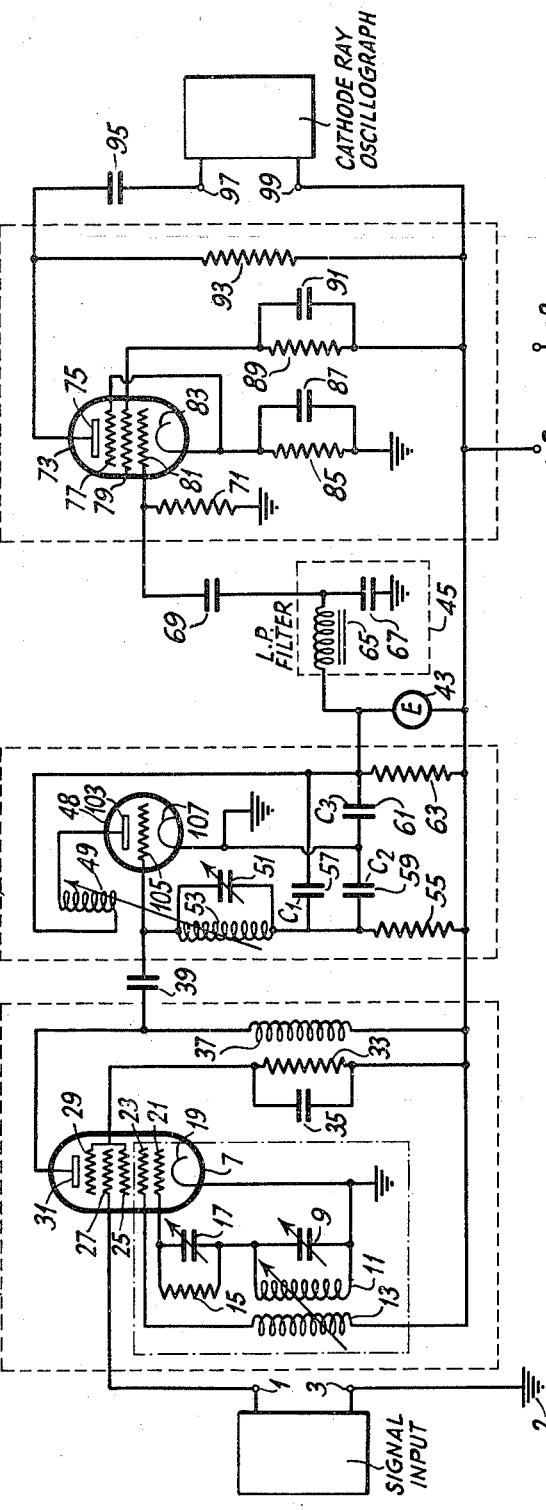
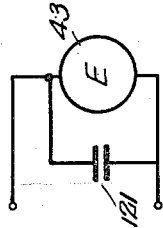
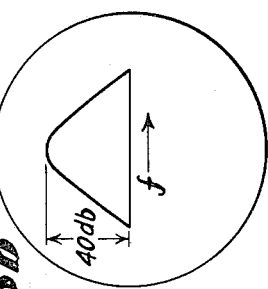
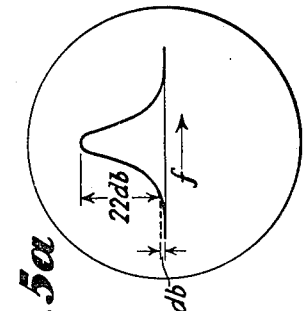
INVENTOR
SAMUEL J. A. M. BAGNO
BY H. S. Grover
ATTORNEY May 14, 1940.   S. J. A. M. BAGNO   2,201,020
ELECTRIC INDICATOR
Filed June 30, 1937   2 Sheets-Sheet 2
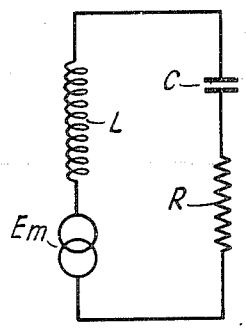
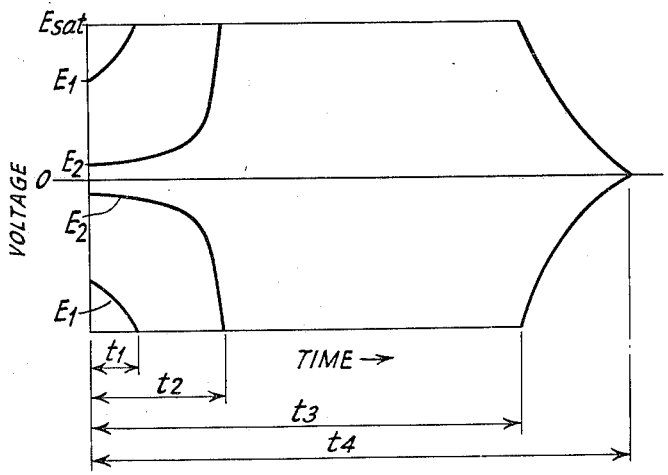
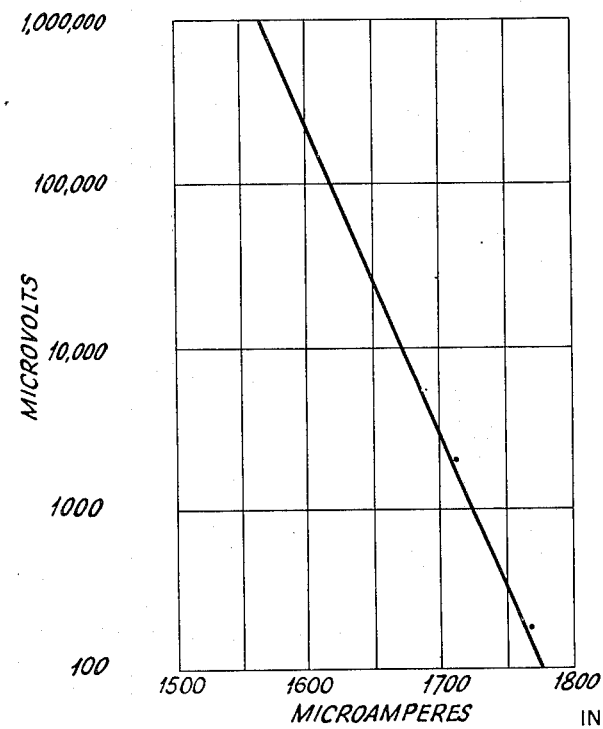
INVENTOR
SAMUEL J. A. M. BAGNO
BY
ATTORNEY Patented May 14, 1940

2,201,020

UNITED STATES PATENT OFFICE 2,201,020

ELECTRIC INDICATOR

Samuel J. A. M. Bagno, New York, N. Y., assignor to Radio Corporation of America, a corporation of Delaware Application June 30, 1937, Serial No. 151,109

6 Claims. (Cl. 171—95)

This invention relates to measuring systems and, in particular, to an electric measuring system for providing measurements over an extremely large range of values with substantially constant precision.

In many applications there are occasions where physical quantities covering ranges of 1–10,000 or more must be measured. Under these conditions it is extremely inconvenient to provide measuring systems which are capable of measuring the quantity in question with the same degree of precision for relatively small values as for relatively large values. For example, in certain electrical circuits, it is desirable to measure voltages varying from the order of 1 micro-volt up to 1 volt, a range in values of a million to one. If these values must be measured with a precision, let us say, of 2%, the measuring system must be capable of measuring a value of 1 micro-volt with a precision of 2% as well as 1 volt to this same precision. Obviously a meter or galvanometer capable of measuring the lowest of the two values would have, generally speaking, insufficient scale capacity to indicate the larger value, and if the measuring device or system were such that a single scale instrument could accomplish this and then, in general, the precision of measurement for the larger value would be much greater than that of the lower value. A little consideration immediately indicates that if the meter is sensitive enough to be able to measure 1 micro-volt to a precision of 2%, then it certainly can measure 1 volt to a much higher order of accuracy. Ordinarily, where such a range of values must be utilized, a number of meters of various overlapping scale ranges are provided; as, for example, where the ranges of values are such as cited above, a galvanometer would be provided for measuring the lower values, say between the range of 1 and 15 micro-volts. A second instrument with a maximum range of 100 micro-volts would then be used for the region between 10 and 100 micro-volts. A third instrument having a maximum indication of the order of 1 milli-volt would then be used to cover the range from 100 to 1000 micro-volts and so on. Obviously the necessity for using a plurality of meters to cover a wide range of voltages or other quantities is undesirable. Alternatively in the past a very sensitive instrument has been provided with a number of shunts or series resistances to extend the ranges of the meter from very low values to very high values. In these cases, however, the use of shunts, series resistors, or other means for increasing the range of the instrument by a ratio factor, generally reduces the precision of measurement, since the multiplying ratio factor entails a further source of error. In order to overcome these deleterious features, I have provided a single instrument which posesses a logarithmic characteristic, that is, the response of my measuring system is equal to a constant times the logarithm of the magnitude of the quantity under measurement. By so doing I am able to cover an extremely wide range of magnitudes with a single instrument, and at the same time to afford a constant precision of measurement. The feature of constant precision or accuracy of measurement follows from the characteristic of a logarithmic response.

It is well known in the art that the slope of a logarithmic curve is proportional to the magnitude of the quantity and accordingly, therefore, where a measuring system or instrument is provided with a logarithmic response or scale, the accuracy of the measurement which is measured by the instantaneous indication divided into the smallest change in magnitude which can be detected, is a constant for any value of magnitude.

This particular feature has considerable utility in many fields, as for example, in the measurement of sound energies, the measurement of the characteristic of ears as a function of sound intensities in the testing of radio receivers, in the measurement of field intensities of radio transmitters, in the measurement of tactile stimulus, in the measurement of light intensities and in the measurement of the sensitivity of the eye to light response—to mention only a few of such fields. Here the range of values easily extends a thousandfold and in many cases, reaches a millionfold or more.

Accordingly, therefore, one of the objects of my invention is to provide a measuring system which is capable of measuring the magnitudes of quantities over extremely wide ranges of values.

A second object of my invention is to provide an extremely sensitive measuring system capable of measuring an extremely wide range of magnitudes with constant precision.

A further object is to provide a new and novel logarithmic response indicating meter with an exceedingly large range.

A still further object of my invention is to provide a logarithmic response detector suitable for use with an oscillograph for visually indicating electrical network response over a wide range of values for determinations of sensitivity and frequency characteristics.

These and other objects of my invention and the methods and means of accomplishing them will be clear from the following description taken together with the drawings, in which:

Fig. 1 shows a schematic circuit diagram of one form of my invention;

Fig. 2 shows a schematic diagram of an equivalent circuit used in describing the action of my invention;

Fig. 3 shows graphically the envelope of modulated carrier wave energy for further describing the action of my invention;

Fig. 4 shows graphically an experimental response characteristic of my new indicating meter;

Figs. 5a and 5b show typical oscillograph response curves for the conventional linear detector and my new logarithmic detector respectively and Fig. 6 shows a by-passing arrangement for a volt-meter to prevent deleterious effects of alternating current.

Referring to the drawings, and in particular, to Fig. 1, I have shown one preferred embodiment of my invention, using a super-regenerative detector 41 as a logarithmic indicator. Briefly Fig. 1 shows a pentagrid converter 5 to which the voltage to be measured is supplied and the output of which is fed to a super-regenerative detector 41. The output of the detector stage feeds to a voltmeter 43 which serves as an amplitude indicating meter. The output is also shown as fed simultaneously to a low pass filter 45 to remove carrier wave components from the output. The filtered output is then fed to an amplifier 47 which has substantially constant amplification over its frequency range and substantially free from phase distortions over the same range. Output terminals of the amplifier 47 are provided so that the output may be supplied to an oscillograph. The filter and amplifier combination is particularly useful where the input voltage to be measured is frequency modulated and where it is desired to have a visual trace of the frequency modulated voltage which may also experience simultaneous amplitude variations.

Briefly, the operation of the device is as follows: The voltage to be measured is fed to the terminals 1 and 3 of the converter 5 to modulate a locally generated source of carrier wave energy. The modulated energy from the converter 5 is then fed to the super-regenerative detector 41 to control the output of the detector stage. The output may then be measured to indicate voltage and may also be filtered and amplified and applied to a visual trace indicating instrument such as a cathode ray oscillograph, for example, where a visible trace of varying voltage is desired.

Describing the operation in somewhat more detail, assuming that the voltage to be measured is a frequency modulated radio carrier, the voltage is applied to the terminals 1 and 3 of the mixer 5 comprising the pentagrid converter tube 7 and the oscillating circuit elements 9, 11, 13, 15, and 17. As is well known in the art, the oscillating circuit elements comprise a conventional oscillator having a tuned grid circuit with plate regeneration, the electrode 23 serving as an anode and the electrode 21 and cathode 19 serving as control electrode and cathode comparable to that of a conventional triode thermionic tube. The electron stream passing the electrode 23 is modulated by the electrode 27 and the variations in intensity of the stream introduced by control potentials on the electrode 27 serves to vary the anode current flowing through the anode 31 and the anode impedance 37. The control electrodes 25 and 29 shield the electrode 27 from the electrodes 21 and 23 to avoid undesired reactions among these electrodes. The shield electrodes 25 and 29 are maintained at suitable potential by the series resistor 33 connected back to the source of energizing potential, and the capacitor 35 serves to by-pass any radio frequency potentials which might be picked up by the electrodes 25 and 29. There will appear consequently across the impedance 37 carrier wave energy of a frequency determined by the circuit elements 9, 11 and 13 modulated by the voltage to be measured applied across the terminals 1 and 3. This modulator carrier frequency energy is then fed capacitively through the condenser 39 to the grid 105 of the tube 48 of the super-regenerative detector 41, the circuit constants 51 and 53 of the detector being so chosen as to tune the detector to a moderately high frequency, such as, for example, 15 megacycles, which frequency is the same as that of the carrier wave energy generator in the mixer 5. The condensers 57, 59 and 61 have their values so chosen as to control the wave shape of the blocking oscillator portion of the super-regenerative detector to provide substantially triangular form, as well as to control the frequency of the blocking oscillator which is preferably placed in the audio-frequency range and may suitably be on the order of 4000 cycles. The super-regenerative detector shown is that of a modified Flewelling circuit. The wave form of the blocking circuit is partially controlled to be triangular by connecting the grid leak 55 directly to the positive terminal of the energizing source. By means of the capacity bridge connection of the condensers 59 and 61, the tendency for the oscillation to block the tube periodically is increased considerably by producing the proper delay of the low frequency plate current component. This delay substantially fixes the time required for the blocking cycle. The departure from a square wave blocking circuit, such as is generally provided by super-regenerative detectors, by the use of a triangular wave is not great enough to alter the theory of the operation cycle.

The resulting plate current of the super-regenerative detector 41 is converted into a voltage change by passing the current through the resistor 63 and using the potential drop in this resistor. It will be readily appreciated that the potential drop in the resistor will be proportional to the plate current and the high impedance voltmeter 43 will, therefore, give an indication proportional to the super-regenerative detector plate circuit changes. The radio frequency components of the carrier wave energy are ineffective to affect the voltmeter since the carrier wave energy is alternating at such a high rate that the meter movement cannot follow the variations thereof. The meter 43 may be suitably by-passed by a condenser 121 as shown in Fig. 6 to avoid any deleterious effects of the alternating current components. However, where it is desired to have a visual trace of the voltage under measurement, a low pass filter 45 is interposed between the output resistor 63 and the input of the amplifier 47. It will be understood, of course, that the half section filter comprising the inductance 65 and the condenser 67 is merely used to indicate one type of filter. Obviously other types of low pass filters can be substituted for the filter shown. The filter cut-off frequency is chosen to be substantially the frequency of the blocking oscillator of the super-regenerative detector 41 so that all radio frequency components are eliminated from the energy serving to actuate the amplifier 47. The amplifier 47 has its constants so chosen as to give linear amplification both for amplitude and frequency and to avoid any phase distortion so that the output energy appearing at the terminals 97 and 99 is strictly proportional to the voltage across the resistor 63. The output energy may then suitably be used by connecting the terminals 97 and 99 to a beam deflecting system of a cathode ray tube so that on the fluorescent end wall of the tube a trace proportional to the output voltage is made visible. The voltage appearing across the terminals 97 and 99, however, will be proportional to the logarithm of the voltage supplied to the terminals 1 and 3 due to the action of the super-regenerator. This comes about in the following fashion:

When the input signal is of the same frequency as the frequency at which the super-regenerator tube 48 tends to oscillate, the signal fed to the grid of the tube is amplified and fed back to the input again through the coupling between the coils 49 and 53. The feed-back signal is further amplified and again fed back. As a result, the signal that was initially fed into the grid 105 of the super-regenerator, builds up exponentially as is well known, until the voltage fed back to the grid 105 from the plate 103 is of such a magnitude as to cause plate current saturation of the tube 48. This saturated condition remains until a further signal paralyzes the tube 48 and thus prevents it from acting as an oscillator. The paralyzing impulse is then removed from the tube and the cycle is permitted to reoccur. The length of time that it takes to saturate the tube depends upon the magnitude of the input signal and since the voltage in the tube balances up exponentially, the length of time required for the saturated condition is directly proportional to the logarithm of the input voltage. If now the blocking cycle is constant and independent of the input, the length of time during which the tube will remain saturated is equal to the time during which the tube is capable of acting as an amplifier less the time required for actual signal build-up within the super-regenerator itself. Ideally, the plate current follows the envelope of the signal super-regenerative stage and consequently, the portion of the plate current during the build-up period is always constant. This can be demonstrated in the following fashion:

Let the input voltage to the super-regenerator be $E_m \sin \omega t$, and the current through the circuit be $i$. The tube in its function as an amplifier feeds more energy into the tank circuit than the original energy of the input, and the amount fed back depends upon the input voltage. It can thus be described as a negative resistance $(-R)$ which adds energy to the circuit instead of absorbing it as a positive resistance would do. The energy that it adds to the circuit depends on the voltage across the tank. This is shown schematically in Figure 2. The current at any instant through the circuit in Figure 2 is equal to (1) $\quad E_m \sin \omega t = -R_i + L\frac{di}{dt} + \int i \frac{dt}{C}$ the solution of which is (2) $\quad i = \frac{E_m}{Z} \sin (\omega t + \theta) + \frac{E_m}{Z} \sin \omega t e^{\frac{R}{2L}t};$ $$\omega = \sqrt{\frac{1}{LC} - \frac{R^2}{4L^2}}$$

$\left(\frac{R}{2L}t \text{ is independent of signal amplification}\right)$

From (2) it is evident that the envelope of the current during the build-up cycle, or the average current, is substantially independent of the amplitude of the signal coming into the super-regenerator from small values of input. This is shown graphically in Figure 3. During saturation of the tube the plate current is constant and the length of time it last varies as the logarithm of the input voltage. Thus it becomes apparent that the average current is equal to a constant less the logarithm of the input voltage. This is especially true since during the decay cycle the tube is completely paralyzed and the average plate current during this portion of the cycle is always constant.

The frequency of resonance of the super regenerator depends on the amount of negative resistance and the amount of positive resistance in the circuit. This formula is given as $$f = \frac{1}{2\pi}\sqrt{\frac{1}{LC} - \frac{R^2}{4L^2}}$$

Since the resistance varies, the resonance frequency likewise varies and by choosing the proper resistance to inductance ratio, the resonance frequency can be made to traverse the band, which may be 30 or 40 k. c. wide, required by the varying frequencies of the frequency modulated input to the super-regenerator in such a way that the output over that range is substantialy constant. This was accomplished by increasing the positive as well as the negative resistance of the super regenerator; and at the same time increasing the input frequency during which the super regeneration cycle occurs. For use with a cathode ray tube the blocking cycle is made to occur at such a frequency as to cover a negligible distance on the cathode ray tube screen. If the frequency modulated cycle takes place in $\frac{1}{60}$ of a second and a three inch cathode ray tube is used, the blocking must be above 4,000 cycles in order that the width of one cycle should be less than .05 inch. This condition is very easily obtained, since the limitations to a frequency higher than 4,000 cycles are the build-up time required and the delay time or the negative and positive resistance of the blocking cycle. If a 20 meter super regenerator is used, the blocking frequency may be well above 15,000 cycles, in which case the cut-off frequency of the filter is raised proportionally.

Due to the inherent extreme sensitivity of the super-regenerator, it is possible to use this type of logarithmic vacuum tube voltmeter with a radio receiver, for example, to cover a tremendous selectivity range and still keep within the saturation characteristics of the tube employed by the receiver. Such a voltmeter above described will respond to a signal of about 1 microvolt and requires a signal of well over a volt to become so thoroughly saturated as to introduce distortion. That the output voltage is proportional to the logarithm of the input voltage over an extremely wide range of voltages is shown in Fig. 4. Fig. 4 shows a characteristic of the voltmeter as a function of the input voltage against output voltage. It will be noted that linearity is preserved over the entire range and that the deviation in no case is greater than 3%.

Figs. 5a and 5b show the advantages accruing from the use of a logarithmic voltmeter such as described above to feed the deflecting system of a cathode ray tube, in contra-distinction to the conventional method of feeding a linear voltage to the beam deflecting system. Fig. 5a shows the linear response of a tuned circuit in which the range of voltages on the output are 40 db., i. e. 100 to 1 as a function of frequency. Such a response curve can be obtained, for example, in the method disclosed in the article entitled "Distortion in Wireless Telephony and Related Applications of the Cathode Ray Oscillograph" by Sandeman and Kipping, pages 811 through 818, in volume 2, No. 25, October 1925 of Experimental Wireless and Wireless Engineering. It will be noted that where the signal level is low, the trace of the curve representing the first 18 db. variation in amplitude conveys practically no information whatsoever, since the amplitude is so small. In contra-distinction to this, however, the response shown in Fig. 5b obtained from the use of a logarithmic voltmeter shows the entire 40 db. range on a uniform scale as regards the ordinate and consequently, the information available from a curve of this sort is much greater since as much information is conveyed during the first 18 db. variation as in the last 22 db. variation. This becomes of considerable importance in checking intermediate frequency transformers or receiver selectivities since the selectivity characteristic can be determined with greater accuracy outside of the immediate region of the band-pass portion which determination is almost impossible to make where linear deflection of the cathode ray beam is used as shown in Fig. 5a.

Having described my invention, what I claim is:

1. An electrical voltage measuring system comprising means for producing carrier wave energy, means for modulating the produced energy by the voltages to be measured, means for super-regeneratively detecting the modulated energy, and means for measuring the detected energy.

2. An electrical voltage depicting system comprising means for producing carrier wave energy, means for modulating the produced energy by the electrical voltages of which a visual depiction is desired, means for super-regeneratively detecting the modulated energy, means for selecting a portion of the detected energy, means for distortionlessly amplifying the selected portion of the detected energy, and means for producing a visual trace under the control of the amplified energy.

3. An electrical voltage measuring system comprising means for producing carrier wave energy, means for modulating the produced energy by the voltages to be measured, means for logarithmically detecting the modulated energy, and means for measuring the detected energy.

4. An electrical voltage depicting system comprising means for producing carrier wave energy, means for modulating the produced energy by the electrical voltages of which a visual depiction is desired, means for logarithmically detecting the modulated energy, means for selecting a portion of the detected energy, means for distortionlessly amplifying the selected portion of the detected energy, and means for producing a visual trace under the control of the amplified energy.

5. In combination, a source of signal voltage, a source of carrier wave energy, means to modulate the carrier wave energy by the signal voltage, a super-regenerative detector having an output circuit, means to feed signal modulated energy to the said detector, and a voltage indicating instrument connected to the output circuit of the detector.

6. In combination, a source of signal voltage, a source of carrier wave energy, means to modulate the carrier wave energy by the signal voltage, a super-regenerative detector having an output circuit, means to feed signal modulated energy to the said detector, a voltage indicating instrument connected to the output circuit of the detector, a filter connected to the output circuit, a cathode ray oscilloscope, and a distortionless amplifier connecting the filter and the oscilloscope.

SAMUEL J. A. M. BAGNO.